May 27, 1941.     D. M. SMITH ET AL     2,243,131
HOLD-DOWN BEARING FOR ROTARY
Filed Jan. 10, 1940     3 Sheets-Sheet 1

DAVID M. SMITH and
LEROY NEWCOMB,
Inventors;

By
Attorney.

May 27, 1941.    D. M. SMITH ET AL    2,243,131
HOLD-DOWN BEARING FOR ROTARY
Filed Jan. 10, 1940    3 Sheets-Sheet 2

DAVID M. SMITH and
LEROY NEWCOMB.
Inventors:

Attorney.

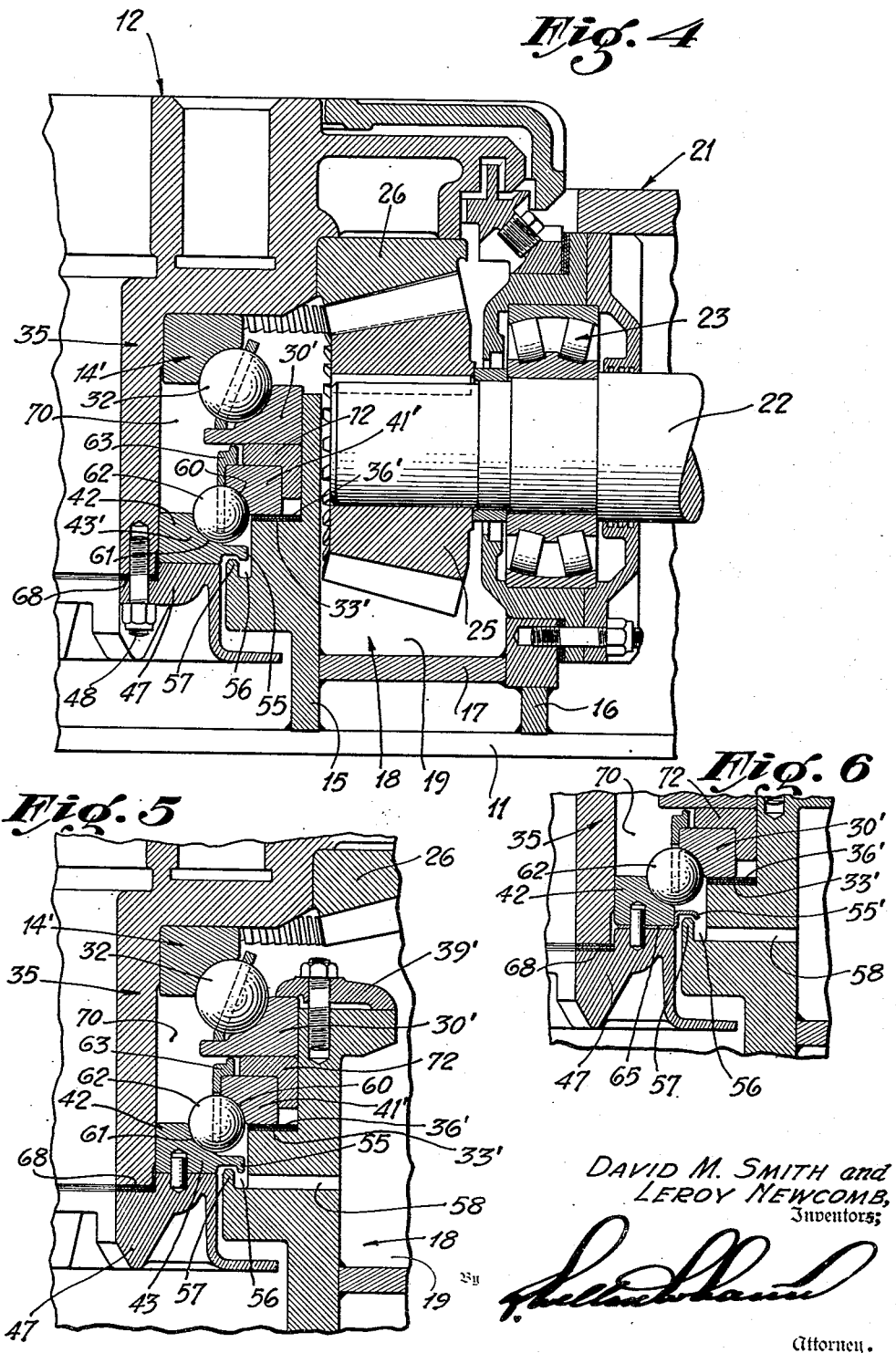

Patented May 27, 1941

2,243,131

UNITED STATES PATENT OFFICE 2,243,131

HOLD-DOWN BEARING FOR ROTARY

David M. Smith, Hermosa Beach, and Leroy Newcomb, Southgate, Calif., assignors to Emsco Derrick & Equipment Company, Los Angeles, Calif., a corporation of California Application January 10, 1940, Serial No. 313,232

15 Claims. (Cl. 308—230)

Our invention relates to rotary machines commonly employed in the oil well drilling industry for rotating the drill pipe and this application for Letters Patent is a continuation-in-part of our copending application, Serial No. 256,962, filed February 17, 1939.

At times during the operation of such a rotary machine there is an upthrust applied to the table of the rotary machine tending to move it upwardly, and it is therefore necessary to have what is known as a "hold-down means" which prevents the table from being raised from place.

It is an object of our invention to provide a rotary machine having simple and sturdy hold-down means which permits ready assembly and disassembly of the table and base, and which is adequately lubricated.

It is another object of our invention to provide a rotary machine in which the lower race of the main bearing is secured to the base and has what we term an "abutment shoulder," in which there is an annular hold-down element removably secured to the table, and which has a hold-down shoulder which extends below the abutment shoulder so as to cooperate therewith in preventing or limiting the raising of the table, and in which lubricant return means is positioned in the base below the shoulders in such manner as to cooperate in an ample circulation of lubricant.

It is a further object of our invention to provide a rotary machine in which the hold-down means is placed below the main bearing and in which there is a continuous supply of lubricant to both the table bearing and the bearing faces of the hold-down means.

It is a further object of our invention to provide a rotary machine wherein the hold-down element may be in the form of a simple annular bushing having a bearing face for engagement with the abutment shoulder, or wherein the hold-down element provides an annular member including or carrying anti-friction or roller type bearings for engagement with the abutment shoulder, this latter type of hold-down element having the advantage that it may be adjusted into close working relation to the abutment shoulder to minimize vibration of the cable during operation.

A further object of the invention is to provide a rotary machine having a table with the customary depending skirt which extends down into a vertical opening through the base, this vertical opening having a counterbore or enlargement above the bottom thereof to form a bearing chamber, the bottom wall of which chamber may be either essentially flat or may be stepped, this bottom wall having therein an oil receiving channel from which oil return passages extend outward. On the depending skirt of the table there is a combined table and hold-down bearing assembly and also an oil throw-off member, these parts residing in the bearing cavity or recess when the table is in operative position on the base, the throw-off member being so positioned that it will deliver into the oil channel such lubricant as passes downward through the table and hold-down bearing means, thereby accomplishing a circulation of oil through such bearings without loss of oil.

In the accompanying drawings we have shown and in the following description we will describe a practical form of our invention. It should be understood, however, that various changes and alterations may be made without departing from the spirit and scope of our invention, and we therefore do not wish to be limited to the exact structure or details herein disclosed, but, on the contrary, wish our invention to be broadly construed in accordance with the appended claims.

Referring to the drawings:

Fig. 4 is an enlarged fragmentary section similar to Fig. 2 but showing anti-friction bearing means incorporated in the hold-down element.

Fig. 5 is an enlarged fragmentary section similar to Fig. 3 but showing the type of hold-down element illustrated in Fig. 4.

Fig. 6 is a fragmentary sectional view showing an alternative manner of forming the oil throw-off shoulder associated on the table skirt with the hold-down element.

Figure 1:
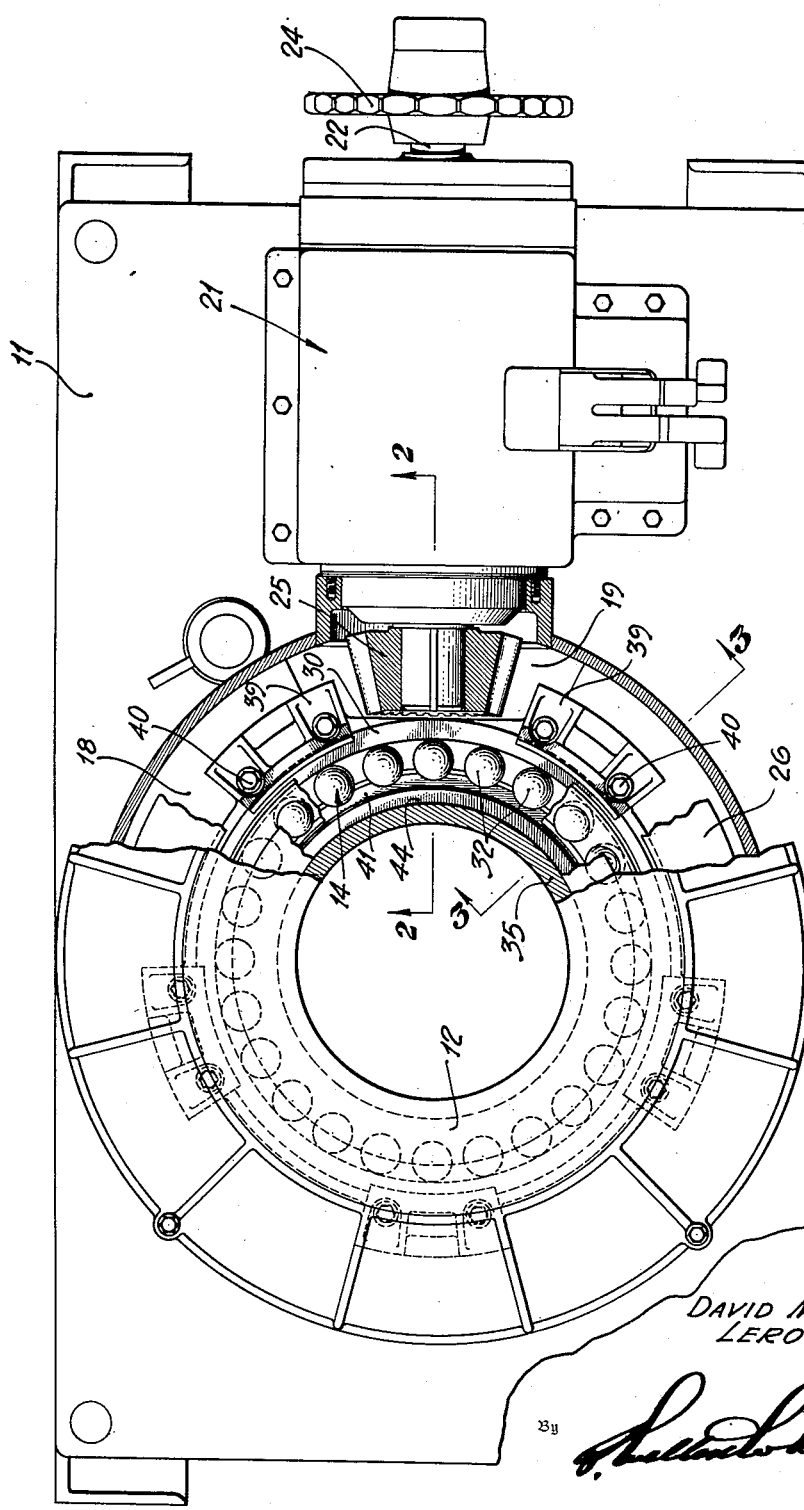
Fig. 1 is a plan view partially sectioned to illustrate a simple form of our invention.
Figure 2:
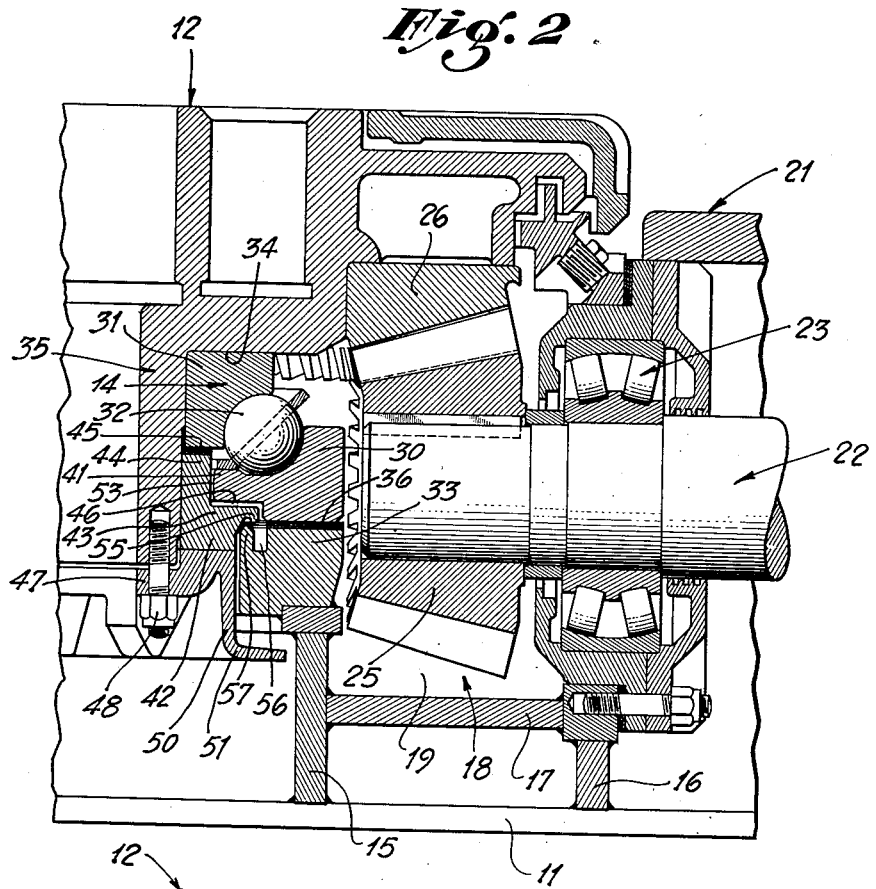
Fig. 2 is an enlarged fragmentary sectional view taken on the line 2—2 of Fig. 1.
Figure 3:
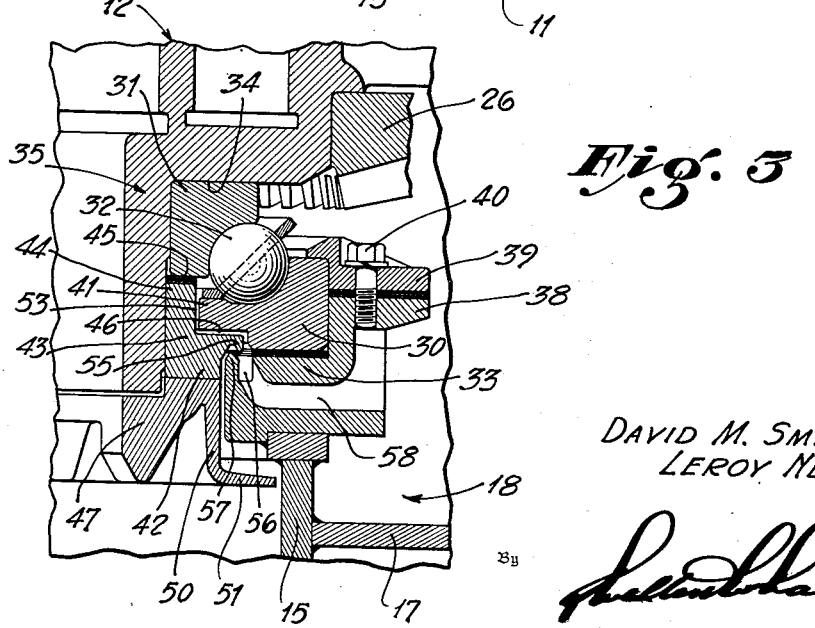
Fig. 3 is an enlarged sectional view taken on the line 3—3 of Fig. 1.

Referring to Figs. 1, 2, and 3 in detail, the numeral 11 represents a base and the numeral 12 represents a table rotatably supported on the base by means of a main bearing generally designated by the numeral 14. The base provides a central opening which is surrounded by inner and outer annular walls 15 and 16 which cooperate with a lower wall 17 to provide an annular lubricant chamber 18 and a lubricant reservoir 19. The table 12 cooperates with the base 11 in forming the enclosed chamber and reservoir, as illustrated in various views of the drawings. For the purpose of rotating the table there is provided a pinion shaft assembly 21 which includes a shaft 22 supported by suitable bearings 23, the shaft 22 having a sprocket 24 on the outer end and a pinion 25 on the inner end, this pinion 25 being located so that at least the lower portion thereof projects down into the lubricant reservoir 19. Mounted on the table 12 is a ring gear 26 which is engaged by the pinion 25 and in this manner the table 12 is rotated.

The parts which we have described do not incorporate the essential elements of our invention but are representative of various elements which may be employed in a rotary machine.

Referring now more particularly to Figs. 2 and 3, we will describe the details of construction cooperating in the first form of our invention.

The bearing 14 includes a lower race 30, an upper race 31, and anti-friction roller means in the form of balls 32. The lower race 30 is supported by a support wall 33 which is preferably provided at the upper end of the inner annular wall 15. The upper race 31 is in engagement with a wall 34 provided by the top portion of the table and surrounds a cylindrical skirt 35. The race 31 is preferably a press fit on the table 12. Placed between the lower race 30 and the support wall 33 are shims 36 which are employed as required to support the table in a proper vertical position so that the teeth of the pinion and ring gear 25 and 26 will mesh properly. The race 30 is secured in place by clamp means which includes stationary clamp elements 38 which are formed outwardly of the support wall 33 and removable clamp elements 39 removably secured to the stationary clamp elements 38 by bolts 40. By this construction the lower race 30 is removably secured to the base.

The hold-down means of our invention includes an inwardly projecting abutment shoulder 41 which is formed integrally with and extends inwardly from the lower race 30. This abutment shoulder 41 could be made in a separate part or could be a part of the base 11. It is indispensable, however, that it be placed below the bearing means 32. Placed on the cylindrical skirt 35 of the table 12 is a hold-down element made in the simple form of a ring or bushing 42 which has an outwardly projecting hold-down shoulder 43 which projects outwardly below the abutment shoulder 41, as shown. The hold-down bushing 42 also has an upwardly projecting cylindrical portion 44 which extends inside the abutment shoulder 41 and the race 30, and between this cylindrical portion and the lower end of the upper race 31 there is provided shim means 45 whereby proper size of space 46 may be provided between the shoulders 41 and 43. The hold-down bushing 42 is secured in place by a bushing clamp 47 which is in turn secured to the skirt 35 by means of stud bolts 48. The bushing clamp 47 has a downwardly projecting wall 50 and an outwardly projecting flange 51 designed to prevent mud from passing upwardly and reaching the bearing structure or the enclosed chamber of the rotary table.

It will be noted that the space 46 is connected to the annular lubricant chamber 18 through the space 53 between the abutment shoulder 41 and the cylindrical portion 44 of the hold-down bushing 42 and the space between the bearing races 30 and 31 and around the balls 32. During the operation of the rotary machine the pinion 25 picks up oil and delivers it to the teeth of the ring gear 26. Some of this oil drops downwardly or is thrown into the main bearing 14 and lubricates it. A portion of this oil will pass through the space 53 and into the space 46, thus providing the necessary lubrication of the lower face of the abutment shoulder 41 and cooperating face of the shoulder 43. This flow of oil may not be very great due to the fact that the only pressure applied to it would be the pressure head of the oil which may accumulate in the bearing or spaces, but there is adequate lubrication for these parts.

In order to prevent the lubricant which is supplied to the space 46 from passing outwardly from the machine and being wasted, our invention provides a means whereby the oil is returned to the lubricant chamber 18 which includes or communicates with the reservoir 19. The outer part of the hold-down shoulder 43 is provided with a depending lip 55. The wall 15 inwardly of the support wall 33 and below the depending lip 55 is provided with an annular lubricant channel 56 which is provided outwardly of an upstanding annular wall 57 which rests below and inwardly of the depending lip 55. Connected to this annular lubricant channel 56 at intervals are drain passages 58 which are connected to the annular lubricant chamber 18. When the rotary table is in operation and lubricant is supplied to the space 46, as already explained, this lubricant passes outwardly to the annular lip 55 which constitutes an oil throw-off means. Due to the centrifugal force, the lubricant is thrown outwardly from this oil throw-off means 55 and will pass into the annular channel and drain passages 56 and 58, which parts 56 and 58 constitute an oil return means.

From the foregoing description it will be seen that we have provided a simple and sturdy hold-down bearing construction which enables the table to be readily installed or removed. In installing the parts, the hold-down bushing 42 is first placed in the base and may rest on the wall 57. The lower race 30 is then secured in place. The bearing means 32 is then placed on the lower race, whereafter the table is installed in place, as shown. During the installing of the lower race 30 the shims 36 are arranged so that there will be proper clearance of the pinion and ring gear teeth. When the table is installed in place the shim means 45 is so arranged that there will be a proper clearance space 46 between the abutment and hold-down shoulders. After these parts have been properly arranged the bushing clamp 47 is then secured in place and the assembly completed.

In a broad sense the invention comprises, as shown in Figs. 2 and 3, a hold-down means disposed below the table bearing and oil return means formed in the base structure in a plane below the abutment shoulder. The hold-down means referred to comprises an upper shoulder 41 and a lower shoulder 43 which extends outwardly thereunder. These shoulders comprise a thrust bearing, but it is evident that in the operation of the device the actual thrust transmitted from the shoulder 43 to the shoulder 41 is carried by the film of heavy oil occupying the space 46. In other words, it may be said that the shoulders 41 and 43 have bearing means therebetween consisting of a layer of lubricant. Our invention comprehends that this bearing means between the shoulders 41 and 43 may take different forms without departure from the spirit of the invention disclosed in Figs. 2 and 3.

In Figs. 4 and 5 I show an alternative form of the invention embracing one form of different hold-down means suggested in the preceding paragraph. In Figs. 4 and 5 those parts which are the equivalents or counterparts of the parts described in Figs. 2 and 3 have been given the same numerals as employed in Figs. 2 and 3 so that they will be thus identified and a detailed repetition of description will not be necessary. Herein the hold-down means, disposed below the table bearing 14', comprises an abutment shoulder 41' having a downwardly presented face 60 and a hold-down bushing 42 comprising a hold-down shoulder 43' with an upwardly directed face 61 lying in general below the face 60 and in spaced relation thereto, the faces 60 and 61 being curved in a cooperative manner to form ball races to receive bearing means in the form of balls 62 which are held in spaced relation by a spacer ring 63. Below the abutment shoulder 41' the base 11 of the rotary machine has oil return means comprising a groove 56, defined in part by a lip 57, and a plurality of passages 58 leading from the groove 56 to the oil chamber or channel 18 which includes or communicates with the reservoir 19. Associated with the hold-down means the table 12 carries an oil throw-off means, which in Figs. 4 and 5 is shown as a lip 55 formed on the bushing 42. Such oil throw-off means 55 may be made separate from the bushing 42. For example, I have in Fig. 6 shown an oil throw-off lip 55' formed on the periphery of an annular plate 65 which is gripped between the bushing 42 and the bushing supporting ring 47.

The members 30' and 41', with the spacer ring 72 therebetween are the equivalent of the ring 30 of Figs. 2 and 3, which ring 30 forms the bearing race to receive the balls 32 and also forms the abutment shoulder 41. In each form of the invention the cooperative relation of the parts is present, and the oil return passage 58 is disposed below the abutment shoulder, thereby making it possible to maintain a continuous gravity circulation of oil down through the table bearing, the hold-down means and through the oil return passage of the base back to the oil chamber and reservoir of the base. To adjust the shoulder 43' and the balls 62 in proper operating relation to the shoulder 41', shims 68 may be placed between the clamping ring 47 and the lower end of the skirt 35. For vertical adjustment of the table 12 so as to bring the ring gear 26 into proper mesh with the pinion 25, shim means 36' are shown between the member 41' and the intermediate step 33' of the bearing chamber or cavity 70 of the base 11.

We claim as our invention:

1. In combination in a rotary machine of the class described: a base; a table; main bearing means including a lower race supported by said base and an upper race supporting said table; an abutment shoulder on said lower race; a hold-down element on said table having a shoulder which extends below said abutment shoulder; a lubricant return means on said table below said bearing means; and lubricant throw-off means formed on said hold-down element below said abutment shoulder for delivering lubricant from the space between said shoulders to said lubricant return means.

2. In combination in a rotary machine of the class described: a base; a table having a depending skirt; main bearing means whereby said table is rotatably supported by said base; an abutment shoulder formed integrally with said bearing means; a hold-down element removably secured to said skirt and having a hold-down shoulder extending below said abutment shoulder; and lubricant return means below said shoulders.

3. In combination in a rotary machine of the class described: a base including a bearing receiving support; a table including a bearing receiving support; bearing means in said supports whereby said table is rotatably supported by said base, said bearing means comprising a hold-down bearing abutment shoulder; a hold-down bearing element removably secured to said table having a hold-down shoulder extending below said abutment shoulder; and lubricant return means below said hold-down shoulder.

4. In combination in a rotary machine of the class described: a base including a bearing receiving support; a table including a bearing receiving support; bearing means in said supports whereby the weight of said table is rotatably supported by said base, said bearing means comprising an abutment shoulder; a hold-down bearing element removably secured to said table having a hold-down shoulder extending below said abutment shoulder; lubricant throw-off means on said hold-down element at the outer part of said hold-down shoulder; and lubricant return means adjacent said lubricant throw-off means.

5. In combination in a rotary machine of the class described: a base; a lower bearing race secured to said base which has an abutment shoulder; a table; an upper race on said table; bearing means between said races; a hold-down element removably mounted on said table and having a hold-down shoulder which extends below said abutment shoulder; an annular depending lip on the outer part of said hold-down shoulder; an annular lubricant channel on said base below said depending lip; and a lubricant passage through which lubricant may flow from said lubricant channel.

6. In combination in a rotary machine of the class described: a base having a lubricant reservoir; a lower bearing race secured to said base; an abutment shoulder projecting inwardly from said lower bearing race; an upper bearing race mounted on said table; bearing means between said races; a hold-down element on said table below said upper race and having an outwardly extending hold-down shoulder which extends below said abutment shoulder; shim means between said upper race and said hold-down element to determine the space between said shoulders; means for delivering lubricant from said lubricant reservoir to said space; and means returning lubricant from said space to said lubricant reservoir.

7. In combination in a rotary machine of the class described: a base having a bearing support; a table on said base; a table bearing between said table and said bearing support; an abutment shoulder on said base below said table bearing; a hold-down element on said table below said table bearing, said element having a shoulder in spaced relation to said abutment shoulder and cooperating with said abutment shoulder to limit upward movement of said table relative to said base; lubricant throw-off means on said table below said shoulder of said hold-down element; and lubricant return means adjacent and below said lubricant throw-off means.

8. In combination in a rotary machine of the class described: a base having a bearing support; a table on said base; a table bearing between said table and said bearing support; an abutment shoulder on said base below said table bearing; a hold-down element on said table below said table bearing, said element having a shoulder spaced downward from said abutment shoulder; anti-friction bearing means between said shoulders to limit upward movement of said table relative to said base; lubricant throw-off means on said table below said shoulder of said hold-down element; and lubricant return means adjacent and below said lubricant throw-off means.

9. In combination in a rotary machine of the class described: a base having a bearing support; a table on said base; a table bearing between said table and said bearing support; an abutment shoulder on said base below said table bearing; a hold-down element on said table below said table bearing, said element having a shoulder spaced downward from said abutment shoulder; anti-friction bearing means between said shoulders to limit radial and upward movement of said table relative to said base; lubricant throw-off means on said table below said shoulder of said hold-down element; and lubricant return means adjacent and below said lubricant throw-off means.

10. In combination in a rotary machine of the class described: a table having a depending skirt; a base having a vertical opening to receive said skirt of said table, the upper part of said opening being enlarged so as to form a bearing cavity with an open, circular oil channel extending around the lower part of said cavity and an oil passage leading from said oil channel; table and hold-down bearing means for said table in said cavity; and an oil throw-off means on said skirt so as to rotate therewith, said throw-off means being positioned so as to deliver lubricant which has passed down through said table and hold-down bearing means into said oil channel.

11. In combination in a rotary machine of the class described: a table having a depending skirt; a base having a vertical opening to receive said skirt of said table, the upper part of said opening being enlarged so as to form a bearing cavity with an open, circular oil channel extending around the lower part of said cavity and an oil passage leading from said oil channel; table and hold-down bearing means for said table in said cavity, said bearing means comprising inner bearing parts secured on said table skirt so as to rotate with said table and an outer bearing means resting in said cavity; means for securing said outer bearing means in said cavity so that it will be held stationary with said base; and an oil throw-off means on said skirt so as to rotate therewith, said throw-off means being positioned so as to deliver lubricant which has passed down through said table and hold-down bearing means into said oil channel.

12. In combination in a rotary machine of the class described: a base having bearing receiving seat means disposed around a table opening; bearing means on said seat means, said bearing means comprising a table bearing and a hold-down abutment projecting radially inward from said seat means; a hold-down element on said table in cooperating relation to said hold-down abutment to prevent said table from being raised from said base; and lubricant return means below said hold down abutment.

13. In combination in a rotary machine of the class described: a base having bearing receiving seat means disposed around a table opening; bearing means on said seat means, said bearing means comprising a table bearing and a hold-down abutment projecting radially inward from said seat means; a hold-down element on said table in cooperating relation to said hold-down abutment to prevent said table from being raised from said base; lubricant throw-off means on said table below said hold-down abutment; and a lubricant return channel on said base in a plane below said throw-off means to receive a lubricant thrown therefrom.

14. In combination in a rotary machine of the class described: a base having an upwardly faced bearing receiving seat means disposed around a table opening; a hold-down abutment ring resting on said seat means; a table on said base having a hold-down bearing element in cooperation with said hold-down abutment ring; a table bearing above said hold-down abutment ring and operating to carry the thrust load of said table on said base; means operating to feed lubricant to said table bearing, which lubricant will pass from said table bearing down between said hold-down abutment ring and said hold-down bearing element; and lubricant return means below said hold-down abutment ring.

15. In combination in a rotary machine of the class described: a base having an upwardly faced bearing receiving seat means disposed around a table opening; a hold-down abutment ring resting on said seat means; a table on said base having a hold-down bearing element in cooperation with said hold-down abutment ring; a table bearing above said hold-down abutment ring and operating to carry the thrust load of said table on said base; means operating to feed lubricant to said table bearing, which lubricant will pass from said table bearing down between said hold-down abutment ring and said hold-down bearing element; lubricant throw-off means on said table below said hold-down abutment ring to throw off lubricant which has passed between said ring and said hold-down bearing element; and a lubricant return channel on said base to receive lubricant from said throw-off means.

DAVID M. SMITH.
LEROY NEWCOMB.